(12) United States Patent
Pericin

(10) Patent No.: US 9,389,947 B2
(45) Date of Patent: Jul. 12, 2016

(54) PORTABLE EXECUTABLE FILE ANALYSIS

(75) Inventor: Tomislav Pericin, Sremska Mitrovica (RS)

(73) Assignee: Reversinglabs Corporation, Cambridge, MA (US)

(*) Notice: Subject to any disclaimer, the term of this patent is extended or adjusted under 35 U.S.C. 154(b) by 232 days.

(21) Appl. No.: 12/846,048

(22) Filed: Jul. 29, 2010

(65) Prior Publication Data

US 2011/0066651 A1  Mar. 17, 2011

Related U.S. Application Data

(60) Provisional application No. 61/229,497, filed on Jul. 29, 2009.

(51) Int. Cl.
*G06F 7/00* (2006.01)
*G06F 17/30* (2006.01)
*G06F 11/07* (2006.01)

(52) U.S. Cl.
CPC ........ *G06F 11/0793* (2013.01); *G06F 11/0715* (2013.01); *G06F 11/0751* (2013.01)

(58) Field of Classification Search
CPC ..... G06F 8/37; G06F 17/2247; G06F 17/271; G06F 9/4406; G06F 9/455; G06F 9/4555; G06F 9/4843; G06F 21/50
USPC ................................................. 707/769, 780
See application file for complete search history.

(56) References Cited

U.S. PATENT DOCUMENTS

| 3,987,420 A | 10/1976 | Badagnani |
| 4,533,997 A | 8/1985 | Furgerson |
| 5,812,848 A | 9/1998 | Cohen |
| 5,892,900 A | 4/1999 | Ginter et al. |
| 5,892,904 A | 4/1999 | Atkinson et al. |
| 5,953,534 A | 9/1999 | Romer et al. |
| 5,983,348 A | 11/1999 | Ji |
| 5,983,366 A | 11/1999 | King |

(Continued)

FOREIGN PATENT DOCUMENTS

| EP | 1148417 A2 | 10/2001 |
| EP | 1594062 A2 | 11/2005 |

(Continued)

OTHER PUBLICATIONS

Draft Standard for Information Technology—Portable Operating System Interface (POSIX®), Copyright © 2006 The Institute of Electrical & Electronics Engineers, Inc. hereafter called "POSIX®". Portable Applications Standards Committee of the IEEE Computer Society and the Open Gro http://ieeexplore.ieee.org/stamp/stamp.jsp?tp=&arnumber=4152624&tag=1.*

(Continued)

*Primary Examiner* — Azam Cheema
(74) *Attorney, Agent, or Firm* — Brian J. Colandreo; Michael T. Abramson; Holland & Knight LLP

(57) ABSTRACT

A portable executable file is analyzed by parsing a binary image of the portable executable file to generate a parsed field. An attribute of the parsed field is determined. The attribute of the parsed field is compared to a valid characteristic of a valid corresponding field based upon, at least in part, a portable executable file format specification. It is determined if the attribute of the parsed field matches the valid characteristic of the valid corresponding field.

12 Claims, 4 Drawing Sheets

(56) References Cited

U.S. PATENT DOCUMENTS

| | | | |
|---|---|---|---|
| 6,026,235 A | 2/2000 | Shaughnessy | |
| 6,202,199 B1 | 3/2001 | Wygodny et al. | |
| 6,367,012 B1 | 4/2002 | Atkinson et al. | |
| 6,802,006 B1 | 10/2004 | Bodrov | |
| 7,174,320 B2 | 2/2007 | Rothrock | |
| 7,181,603 B2 | 2/2007 | Rothrock et al. | |
| 7,299,408 B1* | 11/2007 | Daconta | G06Q 10/10 715/234 |
| 7,349,931 B2 | 3/2008 | Horne | |
| 7,594,136 B2 | 9/2009 | Kerner et al. | |
| 7,814,544 B1 | 10/2010 | Wilhelm | |
| 7,996,904 B1 | 8/2011 | Chiueh et al. | |
| 8,037,536 B2 | 10/2011 | Treadwell et al. | |
| 8,042,179 B2 | 10/2011 | Shoji et al. | |
| 8,161,548 B1 | 4/2012 | Wan | |
| 8,510,615 B2 | 8/2013 | Tredoux | |
| 8,782,615 B2 | 7/2014 | Kollberg et al. | |
| 8,826,071 B2 | 9/2014 | Pericin | |
| 2002/0087914 A1 | 7/2002 | Sarra | |
| 2003/0040898 A1 | 2/2003 | McWilliams et al. | |
| 2003/0070087 A1 | 4/2003 | Gryaznov | |
| 2003/0079145 A1 | 4/2003 | Kouznetsov | |
| 2003/0177371 A1 | 9/2003 | Rothrock et al. | |
| 2003/0191944 A1 | 10/2003 | Rothrock | |
| 2003/0233574 A1 | 12/2003 | Kouznetsov | |
| 2004/0024995 A1 | 2/2004 | Swaine | |
| 2004/0049770 A1* | 3/2004 | Chrysanthakopoulos et al. | 717/162 |
| 2004/0181672 A1 | 9/2004 | Ferri | |
| 2005/0040944 A1 | 2/2005 | Contestabile | |
| 2005/0132356 A1* | 6/2005 | Cross et al. | 717/174 |
| 2005/0172337 A1 | 8/2005 | Bodorin et al. | |
| 2006/0236397 A1 | 10/2006 | Horne | |
| 2007/0101435 A1 | 5/2007 | Konanka et al. | |
| 2007/0130421 A1 | 6/2007 | Ahmad et al. | |
| 2007/0214461 A1 | 9/2007 | Glatron et al. | |
| 2007/0260919 A1 | 11/2007 | Kerner et al. | |
| 2008/0209551 A1 | 8/2008 | Treacy et al. | |
| 2009/0013405 A1* | 1/2009 | Schipka | H04L 63/145 726/22 |
| 2009/0126012 A1 | 5/2009 | Treadwell et al. | |
| 2009/0133125 A1 | 5/2009 | Choi et al. | |
| 2010/0005054 A1* | 1/2010 | Smith et al. | 707/2 |
| 2010/0024036 A1 | 1/2010 | Morozov et al. | |
| 2010/0131932 A1* | 5/2010 | Kato | G06F 9/44521 717/136 |
| 2010/0177250 A1* | 7/2010 | Hoshino | H04N 5/772 348/714 |
| 2011/0029805 A1 | 2/2011 | Pericin | |
| 2011/0035731 A1 | 2/2011 | Pericin | |
| 2013/0198119 A1 | 8/2013 | Eberhardt et al. | |

FOREIGN PATENT DOCUMENTS

| | | |
|---|---|---|
| TW | 200307208 B | 12/2003 |
| TW | 200820678 A | 5/2008 |
| TW | 482013 | 4/2015 |
| TW | 494751 | 8/2015 |

OTHER PUBLICATIONS

Copyright: 2006. By Thames Tower, Station Road, Reading, Berkshire RG1 1LX, UK Note that: U and V are the same reference, since the system does not let me type all lines in 'U' section, I typed the rest in V section.*

Weber, et al., "A Toolkit for Detecting and Analyzing Malicious Software," Proceedings of the 18th Annual Computer Security Applications Conference, pp. 423-431, 2002.

"Microsoft Portable Executable and Common Object File Format Specification," Microsoft Corporation, Revision 6.0—Feb. 1999, pp. 1-76.

Josse, Sebastien, "Secure and Advanced Unpacking Using Computer Emulation," Journal in Computer Virology, May 4, 2007, vol. 3, No. 3, XP-002611754, pp. 221-236.

Labir, E., "Unpacking by Code Injection," Code Breakers Journal, 2004, vol. 1, No. 2, XP008113772, pp. 1-16.

Kath, Randy, "The Portable Executable File Format from Top to Bottom," Dec. 31, 1997, XP-002390459.

International Search Report with Written Opinion, dated Dec. 13, 2010, received in international patent application No. PCT/US2010/043660, 12 pgs.

International Search Report with Written Opinion, dated Dec. 8, 2010, received in international patent application No. PCT/US2010/043666, 14 pgs.

International Search Report with Written Opinion, dated Nov. 29, 2010, received in international patent application No. PCT/US2010/043657, 11 pgs.

IEEE Xplore Digital Library Search results received with Office Action mailed Aug. 29, 2012 in related Utility U.S. Appl. No. 12/846,048 (5 pages).

International Preliminary Report on Patentability, mailed Feb. 9, 2012, and received for International Patent Application No. PCT/US2010/043657, 6 pgs.

International Preliminary Report on Patentability, mailed Feb. 9, 2012, and received for International Patent Application No. PCT/US2010/043660, 7 pgs.

International Preliminary Report on Patentability, mailed Feb. 9, 2012, and received for International Patent Application No. PCT/US2010/043666, 9 pgs.

Taiwan Notice of Allowance issued on Mar. 2, 2015 in corresponding Application No. TW 099125054.

Taiwan Office Action issued on Jan. 30, 2015 and received on Feb. 4, 2015 in corresponding Application No. TW 099125053.

Non-Final Office Action issued on Jul. 22, 2015 in corresponding U.S. Appl. No. 12/846,044.

Non-Final Office Action issued on Nov. 21, 2012 in counterpart U.S. Appl. No. 12/846,044.

Final Office Action issued on Jul. 3, 2013 in counterpart U.S. Appl. No. 12/846,044.

Non-Final Office Action issued on Jun. 10, 2014 in counterpart U.S. Appl. No. 12/846,044.

Final Office Action issued on Dec. 3, 2014 in counterpart U.S. Appl. No. 12/846,044.

Min-Jae Kim et al., "Design and Performance Evaluation of Binary Code Packing for Protecting Embedded Software against Reverse Engineering", IEEE, 2010 <http://ieeexplore.ieee.org/stamp/stamp.jsp?tp=&arnumber=5479571>, pp. 1-7.

Silvio Cesar et al., "Classification of Malware Usina Structure Control Flow", Australian Computer Society, 2010, <http://delivery.acm.org/10.1145/1870000/1862301/p61-cesare.pdf>. pp. 1-10.

Goppit, "Portable Executable File Format—A Reverse Engineer View", CodeBreakers, 2006, <http://www.woodmann.com/collaborative/knowledge/images/Bin_Portable_Executable_File_Format_%E2%80%93_A_Reverse_Engineer_View_2012-1-31_16.43_CBM_1_2_2006_Goppit_PE_Format_Reverse_Engineer_View.pdf>, pp. 1-87.

* cited by examiner

US 9,389,947 B2

PORTABLE EXECUTABLE FILE ANALYSIS

CROSS-REFERENCE TO RELATED APPLICATIONS

This application claims the benefit of U.S. provisional patent application Ser. No. 61/229,497, filed on 29 Jul. 2009, the entire disclosure of which is incorporated herein by reference.

TECHNICAL FIELD

This application generally relates reverse engineering software, and more particularly relates to unpacking software and validity analysis of software files.

BACKGROUND OF THE DISCLOSURE

Portable executable file format (PE file format), as defined by Microsoft Corporation in the "Microsoft Portable Executable and Common Object File Format Specification" is a file format for executables, object code and DLL's (dynamic link libraries). PE files are used in 32-bit and 64-bit versions of the Microsoft Windows operating systems. The PE file format is a highly versatile format that can be used in numerous operating system environments and supports various processor solutions.

Software developers may use various schemes to protect software, including PE files. For example, software packers may be utilized to compress binaries, which may decrease bandwidth usage associated with transferring the binaries and storage volume. Similarly, packers may be utilized to protect intellectual property embodied within the software and to prevent code theft. Packing may involve various schemes of compression and/or encryption that may obfuscate the contents of the executable code. Running the packed executable file may unpack the original executable code (e.g., which may include decompressing and/or decrypting) and then transferring control to the original executable code. As such, the nature of the executable code may not be known until the software is actually executing. This can be problematic, for example, if the executable code is malware or other undesirable software, as the nature of the software may not be known until it is too late.

SUMMARY OF THE DISCLOSURE

According to a first implementation, a computer implemented method includes parsing, by a computing device, a binary image of a portable executable file to generate a parsed field, and determining, by the computing device, an attribute of the parsed field. The method also includes comparing, by the computing device, the attribute of the parsed field to a valid characteristic of a valid corresponding field based upon, at least in part, a portable executable file format specification. The method further includes determining, by the computing device, if the attribute of the parsed field matches the valid characteristic of the valid corresponding field.

One or more of the following features may also be included. The parsed field may include one or more of a portable executable format signature, an ImageBase field, a SizeOfImage field, a FileAlignment field, a SectionAlignment field, an EntryPoint address, an import table, an import address table, an export table, a relocation table, a resource table, a thread local storage table, a load configuration table, a bound import table, a COM table, and a portable executable section table. The attribute of the parsed field may include one or more of a field identifier, a field length, and a field content.

Determining if the attribute of the parsed field matches the valid characteristic of the valid corresponding field may include determining, by the computing device, if the attribute of the parsed field is valid for a predetermined operating system. It may be determined if the parsed field does not match the valid characteristic of the valid corresponding field. If the parsed field does not match the valid characteristic of the valid corresponding field, a likelihood of modifying the parsed field that does not match the valid characteristic of the valid corresponding field to generate a valid field may be determined.

The method may also include determining, by the computing device, if the binary image of the portable executable file includes a dynamic link library, a kernel driver, or an executable object.

According to another implementation, a computer program product includes a computer readable medium having a plurality of instructions stored on it. When executed by a processor, the instructions cause the processor to perform operations including parsing a binary image of a portable executable file to generate a parsed field, and determining an attribute of the parsed field. The attribute of the parsed field is compared to a valid characteristic of a valid corresponding field based upon, at least in part, a portable executable file format specification. It is determined if the attribute of the parsed field matches the valid characteristic of the valid corresponding field.

One or more of the following features may be included. The parsed field may include one or more of a portable executable format signature, an ImageBase field, a SizeOfImage field, a FileAlignment field, a SectionAlignment field, an EntryPoint address, an import table, an import address table, an export table, a relocation table, a resource table, a thread local storage table, a load configuration table, a bound import table, a COM table, and a portable executable section table. The attribute of the parsed field may include one or more of a field identifier, a field length, and a field content.

Determining if the attribute of the parsed field matches the valid characteristic of the valid corresponding field may include determining if the attribute of the parsed field is valid for a predetermined operating system. It may be identified if the parsed field does not match the valid characteristic of the valid corresponding field.

A likelihood of modifying the parsed field that does not match the valid characteristic of the valid corresponding field to generate a valid field may be determined. Further, it may be determined if the binary image of the portable executable file includes a dynamic link library, a kernel driver, or an executable object.

According to yet another implementation, a system includes a processor, and a memory coupled with the processor. A first software module is executable by the processor and the memory. The first software module is configured to parse a binary image of a portable executable file to generate a parsed field. A second software module is executable the by processor and the memory. The second software module is configured to determine an attribute of the parsed field. A third software module is executable by the processor and the memory. The third software module is configured to compare the attribute of the parsed field to a valid characteristic of a valid corresponding field based upon, at least in part, a portable executable file format specification. A fourth software module is executable by the processor and the memory. The fourth software module is configured to determine if the attribute of the parsed field matches the valid characteristic of the valid corresponding field.

One or more of the following features may be included. The parsed field may include one or more of a portable executable format signature, an ImageBase field, a SizeOfImage field, a FileAlignment field, a SectionAlignment field, an EntryPoint address, an import table, an import address table, an export table, a relocation table, a resource table, a thread local storage table, a load configuration table, a bound import table, a COM table, and a portable executable section table. The attribute of the parsed field may include one or more of a field identifier, a field length, and a field content.

The fourth software module, which is configured to determine if the attribute of the parsed field matches the valid characteristic of the valid corresponding field, may further be configured to determine if the attribute of the parsed field is valid for a predetermined operating system. A fifth software module may be executable by the processor and the memory. The fifth software module may be configured to identify if the parsed field does not match the valid characteristic of the valid corresponding field.

A sixth software module may be executable by the processor and the memory. The sixth software module may be configured to determine a likelihood of modifying the parsed field that does not match the valid characteristic of the valid corresponding field to generate a valid field. A seventh software module may be executable by the processor and the memory. The seventh software module may be configured to determine if the binary image of the portable executable file includes a dynamic link library, a kernel driver, or an executable object.

The details of one or more implementations are set forth in the accompanying drawings and the description below. Other features and advantages will become apparent from the description, the drawings, and the claims.

DETAILED DESCRIPTION OF EXEMPLARY EMBODIMENTS

Figure 1:
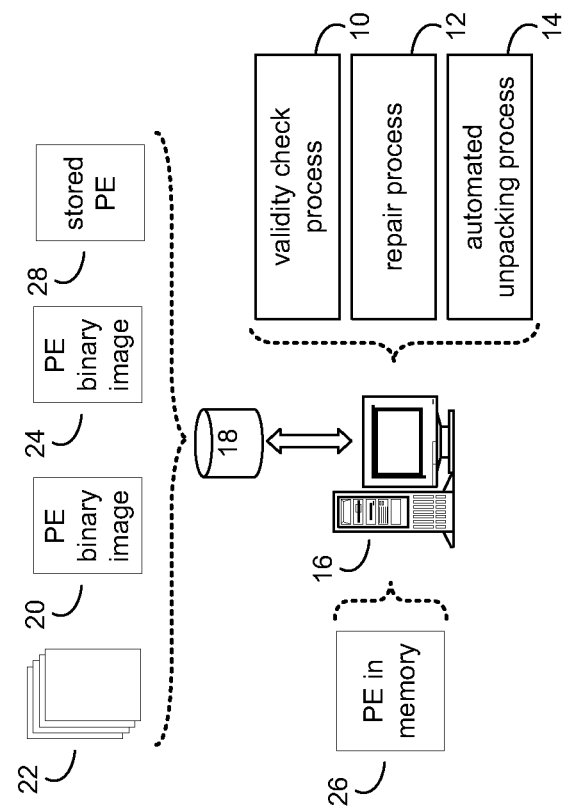
FIG. 1 schematically depicts a computing device that may execute one or more of a validity check process, a repair process and a automated unpacking process.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium include a computer-readable storage medium, which may be, for example, but is not limited to, an electronic, magnetic, optical, electromagnetic, infrared, or semiconductor system, apparatus, a device, or any suitable combination of the foregoing. Exemplary computer readable storage medium may include, but is not limited to, a portable computer diskette, a hard disk, a solid state disc drive, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any medium that can contain, or store a program for use by or in connection with an instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on a single computing device, e.g., as a stand-alone software package, and or may be at least partly executed on multiple computing devices that may be remote to one another. In the latter scenario, remote computing devices may be connected to one another through a local area network (LAN) or a wide area network (WAN), or the connection may be made to one or more remote computing devices (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown validity check process 10, repair process 12, and automated unpacking process 14 that may each reside on and may be executed by computing device 16. While each of validity check process 10, repair process 12, and automated unpacking process 14 are shown residing on computing device 12, this is intended for illustrative purposes only, as one or more of validity check process 10, repair process 12, and automated unpacking process 14 may reside on a separate computing device.

Examples of computing device 16 may include, but are not limited to: a personal computer, a server computer, a series of server computers, a mini computer, and a mainframe computer. Computing device 16 may run an operating system, for example, Microsoft® Windows® XP, or Red Hat® Linux®, for example. Various additional/alternative computing devices and operating systems may equally be utilized. For example, computing device 16 may be part of a distributed computing network with one or more of validity check process 10, repair process 12, and automated unpacking process 14 being executed, in whole or in part, on another computing device coupled with computing device 16 via a data network (e.g., a LAN, a WAN, the Internet, etc.).

As will be discussed below in greater detail, validity check process 10 may parse a binary image of a portable executable file to generate a parsed field. Validity check process 10 may also determine an attribute of the parsed field. Further validity check process 10 may compare the attribute of the parsed field to a valid characteristic of a valid corresponding field based upon, at least in part, a portable executable file format specification. Validity check process 10 may also determine if the attribute of the parsed field matches the valid characteristic of the valid corresponding field.

Further, and as will also be discussed below in greater detail, repair process 12 may identify an invalid field of a portable executable file. Repair process 12 may also determine a likelihood of repairing the invalid field of the portable executable file. Repair process 12 may generate a repair model for repairing the invalid field of the portable executable file. Repair process 12 may repair the invalid field of the portable executable file is repaired based upon, at least in part, the repair model.

Similarly, and as will also be discussed below in greater detail, automated unpacking process 14 may set a debugging breakpoint at an original entry point address of a packed portable executable file. Automated unpacking process 14 may also execute a debugging process for the packed portable executable file to obtain a debugged portable executable file in memory. Automated unpacking process 14 may also collect one or more of import address table data and relocation table data during execution of the debugging process for the packed portable executable file. Automated unpacking process 14 may copy the debugged portable executable file in memory to a storage medium, and may terminate the debugging process.

The instruction sets and subroutines of validity check process 10, repair process 12, and automated unpacking process 14, which may include one or more software modules, and which may be stored on storage device 18 coupled to computing device 16, may be executed by one or more processors (not shown) and one or more memory modules (not shown) incorporated into computing device 16. Storage device 18 may include but is not limited to: a hard disk drive; a solid state drive, a tape drive; an optical drive; a RAID array; a random access memory (RAM); and a read-only memory (ROM).

Due to the fact that PE (portable executable) files contain executable code, it may be desirable to perform file validation prior to execution of the binary object (e.g., the binary image of the PE file). Validity check process 10 may analyze a PE binary image prior to execution to determine if the PE file is a valid binary image. A valid binary image may refer to a file that can be used by a given operating system, either as an image that contains executable code or other type of multimedia information.

Figure 2:
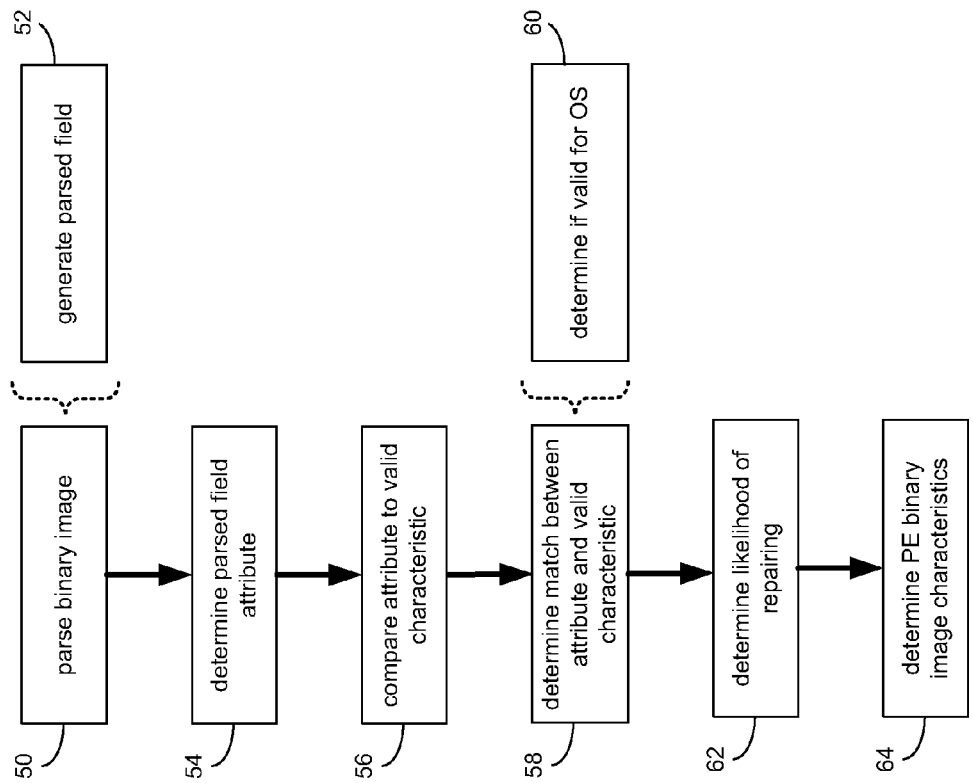
FIG. 2 is a flow diagram of a process performed by the validity check process of FIG. 1.

As discussed above, and referring also to FIG. 2, validity check process 10 may parse 50 a binary image of a portable executable file (e.g., PE binary image 20, residing on storage device 18, shown in FIG. 1) to generate 52 a parsed field. Validity check process 10 may also determine 54 an attribute of the parsed field. Further, validity check process 10 may compare 56 the attribute of the parsed field to a valid characteristic of a valid corresponding field based upon, at least in part, a portable executable file format specification. Validity check process 10 may determine 58 if the attribute of the parsed field matches the valid characteristic of the valid corresponding field.

Validity check process 10 may parse 50 PE binary image 20 to generate 52 a parsed field. Validity check process 10 may parse 50 PE binary image 20 to generate 52 a plurality of fields consistent with PE file format 100. For example, validity check process 10 may generally parse 50 PE binary image into a portable executable format signature, an ImageBase field, a SizeOfImage field, a FileAlignment field, a SectionAlignment field, an EntryPoint address, an import table, an import address table, an export table, a relocation table, a resource table, a thread local storage table, a load configuration table, a bound import table, a COM table, and a portable executable section table.

While several fields have been indicated, these are intended only for illustrative purposes only, as validity check process 10 may parse 50 PE binary image 20 into various additional/alternative fields selected based upon design criteria and user need. Additionally, parsing 50 PE binary image 20 to generate 52 one or more parsed fields, may include, but is not limited to, physically isolating each field (e.g., copying each field into a separate file, database field, or the like), individually reading each field, associating an offset with the beginning (and/or ending) of each field, or the like. As such, parsing 50 PE binary image 20 to generate 52 one or more parsed fields may allow individual examination of each field.

As discussed above, validity check process 10 may also determine 54 an attribute of the parsed field. The attribute determined 54 by validity check process 10 may include one or more of a field identifier, a field length, and a field content. For example, validity check process 10 may determine 54 that PE binary image 20 includes an ImageBase field having a value of 0x00400000, a SectionAlignment field having a value of 0x1000, and a FileAlignment field having a value of 0x200.

Validity check process 10 may compare 56 the one or more determined 54 attributes of the parsed field to a valid characteristic of a valid corresponding field based upon, at least in part, a portable executable file format specification. A valid corresponding field may include a field that is required or allowed by the "Microsoft Portable Executable and Common Object File Format Specification" published by Microsoft Corporation (PECOFF), and which corresponds to a parsed field. For example, a valid corresponding field for the parsed ImageBase field may be the ImageBase field allowed as an option Windows specific field by PECOFF. A valid characteristic of a valid corresponding field may include a characteristic that is allowable by PECOFF. For example, PECOFF may specify acceptable field identifiers, field lengths and field contents of an accepted PE binary image. For example, PECOFF may define a default ImageBase value of 0x00400000, and may require that the value be a multiple of 64 K. Similarly, PECOFF may specify that the SectionAlignment field have a value that is greater than or equal to the FileAlignment. Further, PECOFF may specify that the FileAlignment have a value that is a power of 2 between 512 and 64 K, with a default value of 512. Accordingly, the foregoing may be example of valid characteristics for the identified fields.

Validity check process 10 may determine 58 if the attribute of the parsed field matches the valid characteristic of the valid corresponding field based upon, at least in part, the comparison 56 between the attribute of the parsed field and a valid characteristic of a valid corresponding field. Continuing with the above stated example, the determined 54 attribute for the FileAlignment field of PE binary image 20 was 512. As also discussed above, PECOFF may specify that the FileAlignment field have a value that is a power of 2 between 512 and 64 K. Accordingly, validity check process 10 may determine 58 that the attribute of parsed FileAlignment field (e.g., having a value of 512) matches a valid characteristic of a valid FileAlignment field.

Determining 58 if the attribute of the parsed field matches the valid characteristic of the valid corresponding field may include determining 60 if the attribute of the parsed field is valid for a predetermined operating system. Again, continuing with the above-stated example, validity check process 10 may have determined 54 a ImageBase field value of 0x00400000 for PE binary image 20. This determined value may be the default value for the operating systems Windows NT, Windows 2000, Windows XP, Windows 95, Windows 98, and Windows Me. However, the ImageBase field default value for Windows CE is 0x00010000, per PECOFF. Accordingly, validity check process 10 may determine 60 that the parsed ImageBase field for PE binary image 20 is not valid for Windows CE.

Validity check process 10 may determine 58 if the parsed field does not match the valid characteristic of the valid corresponding field. Continuing with the above-stated example, PECOFF specifies that the SectionAlignment field have a value that is greater than, or equal to, the FileAlignment. Further, validity check process 10 may have determined 54 a SectionAlignment field attribute of 256 and a FileAlignment field attribute of 512 for PE binary image 20. Accordingly, as the determined 54 SectionAlignment field attribute (i.e., 256) is not greater than or equal to the determined 54 FileAlignment field attribute (i.e., 512) for PE binary image 20, validity check process 10 may determine 58 that the parsed SectionAlignment field does not match a valid characteristic of a valid corresponding field (i.e., the determined 54 SectionAlignment field attribute is not greater than or equal to the determined 54 FileAlignment field attribute). Accordingly, validity check process 10 may provide an indicator (e.g., may provide an indicator in a graphical user interface, not shown).

If the parsed field does not match the valid characteristic of the valid corresponding field, validity check process 10 may determine 62 a likelihood of modifying the parsed field that does not match the valid characteristic of the valid corresponding field to generate a valid field. Validity check process 10 may determine 62 the likelihood of modifying the parsed field to generate a valid field based upon, at least in part, the number and nature of errors in a field that does not match the valid characteristic of a valid corresponding field. For example, and continuing with the above-discussed example, the parsed SectionAlignment field of PE binary image 20 does not match a valid characteristic of a valid SectionAlignment field because the value is less than the value of the FileAlignment field. Validity check process 10 may determine 62 a relatively strong likelihood of being able to modify the SectionAlignment filed of PE binary image 20 to generate a valid characteristic as the parsed SectionAlignment field of PE binary image 20 includes a single well defined error (namely, the value is less than the FileAlignment field). It may, for example, be possible to modify the SectionAlignment field to include a value that is greater than or equal to the FileAlignment field. Although some recursive testing may be necessary to modify the SectionAlignment field of PE binary image 20 to achieve a valid field it may be reasonably likely that such a modification may be achieved.

The likelihood of modifying a field to generate a valid field may be determined 62 based upon, at least in part, one or more empirically determined rules. The one or more empirically determined rules may be based upon, at least in part, various possible types of errors that may occur in various fields, and the possible modifications that may be implemented to correct the errors. As such, an error type in a given field for which there may be relatively few possible modifications that may generally result in a valid field, validity check process 10 may determine 62 a relatively high likelihood of modifying the field to generate a valid field. Conversely, for an error type having many possible modifications, many of which may not result in a valid field, validity check process 10 may determine 62 a relatively low likelihood of modifying the field to generate a valid field. Similarly, if the number of detected errors between the parsed field and a valid corresponding field are relatively large, validity check process 10 also determine 62 a relatively low likelihood of modifying the field to generate a valid field.

Validity check process 10 may also determine 64 if the binary image of the portable executable file includes a dynamic link library, a kernel driver, or an executable object. Validity check process 10 may determine 64 the nature of PE binary image 20 based upon, for example, one or more of the included fields, the content of the included fields, or the like, by evaluating the parsed fields relative to possible valid characteristics and possible valid fields. Various additional/alternative characteristics of PE binary image 20 may similarly be determined. For example, validity check process 10 may determine one or more of an environment in which the PE file may execute, if the PE file is a console or other application with a graphical user interface, if the PE file includes dependencies and whether the dependencies exist on the target system, if the PE file includes depend functions and whether the dependent function exist in libraries available on the target system, etc.

As briefly mentioned above, validity check process 10 may provide an output indicating the various parsed fields, field attributes, validity of the fields, nature of the PE file, etc. In an embodiment, validity check process 10 may provide a graphical user interface, through which the various outputs may be rendered. Additionally/alternatively validity check process 10 may provide an output to a database, file, etc., which may be consumed by a user via an appropriate program, such as a database application. Various other suitable outputs will be appreciated by those having skill in the art.

PE binary images may be come damaged through various mechanisms. For example, PE files may become damaged when the files are transferred from one media to another. Similarly, errors may be introduced by software packers (e.g., UPX, PECompact, ASPack, etc.). Error introduced by software packers may render some files valid only for certain versions of operating systems that support PE file formats. Accordingly, repair process 12 may be implemented to repair damaged PE files.

Figure 3:
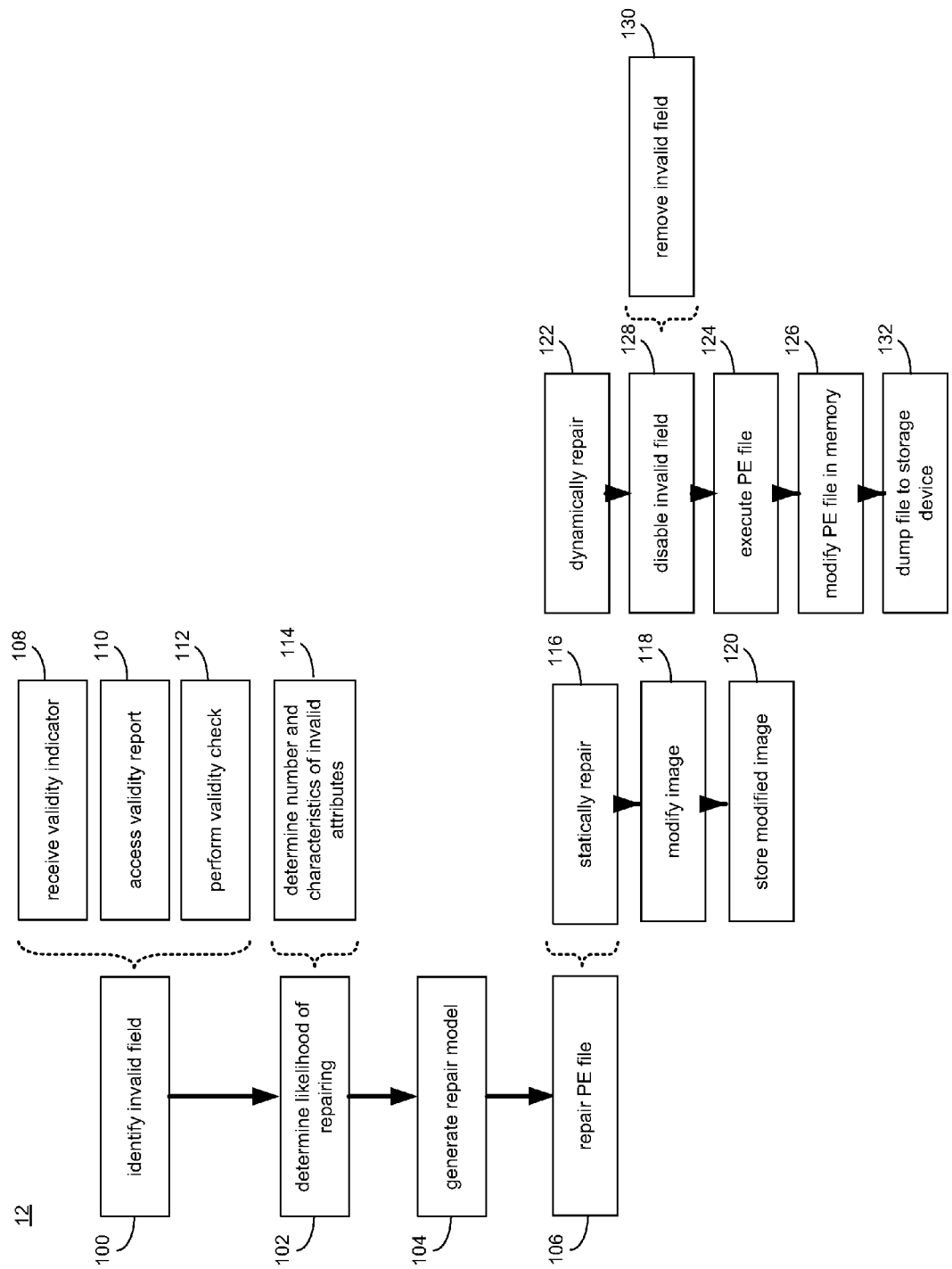
FIG. 3 is a flow diagram of a process performed by the repair process of FIG. 1.

With reference also to FIG. 3, repair process 12 may identify 100 an invalid field of a portable executable file (e.g., PE binary image 20 shown in FIG. 1). Further, repair process 12 may determine 102 a likelihood of repairing the invalid field of the portable executable file. Repair process 12 may generate 104 a repair model for repairing the invalid field of the portable executable file. Repair process 12 may repair 106 the invalid field of the portable executable file based upon, at least in part, the repair model generated 104 by repair process 12.

Repair process 12 may identify 100 an invalid field of PE binary image 20 utilizing a variety of mechanisms. For example, repair process 12 may receive 108 an indicator from validity check process 10 (described in detail above) indicating the validity of PE binary image 20 and/or subset parts of PE binary image 20 (i.e., the validity of the various fields of PE binary image 20). Repair process 12 may receive 108 the indicator directly from validity check process 10. Additionally/alternatively, in an embodiment in which validity check process 10 may generate a validity report (e.g., in the form a file, database entries, or the like), repair process 12 may identify 100 an invalid field (and/or a plurality of invalid fields) by accessing 110 the validity report and interpreting the contents thereof.

In further embodiments, repair process 12 may identify 100 an invalid field of PE binary image 20 by performing 112 one or more validity checks on PE binary image 20. For example, repair process 12 may perform one or more validity checks on PE binary image 20 in a manner similar to that discussed above with reference to validity check process 10. For example, repair process 12 may generally parse PE binary image 20 into a plurality of fields, and may compare attributes of the plurality of fields to valid characteristics of valid corresponding fields. As discussed above, valid characteristics of valid corresponding fields may be specified by PECOFF. Accordingly, the validity of a field (and/or of PE binary image 20 as a whole) may be determined based upon, at least in part, whether the various fields and attributes comply with PECOFF. Therefore, repair process 12 may identify 100 an invalid field as a field having an attribute that does not comply with a valid characteristic of a valid corresponding fields as specified by PECOFF.

When identifying 100 an invalid field, repair process 12 may examine all fields of PE binary image 20, and/or may give special attention to the most crucial fields of PE binary image 20. Examples of fields that may be particularly important (e.g., which may have the greatest impact on the executability of PE binary image 20) may include, but are not limited to, PE format signatures, PE specific fields (e.g., ImageBase, SizeOfImage, FileAlignment, SectionAlignment, and EntryPoint address), and PE specific tables (e.g., Import table, Import address table, Export table, Relocation table, Resource table, Thread local storage table, Load configuration table Bound import table, COM table, and PE section tables).

As discussed above, repair process 12 may determine 102 a likelihood of repairing the invalid field (or multiple invalid fields) of PE binary image 20. Repair process 12 may determine 102 a likelihood or repairing the invalid field of PE binary image 20 based upon, at least in part, determining 114 the number and characteristics of attributes of the invalid field that do not match a valid characteristic of a valid corresponding field based upon, at least in part, a portable executable file format specification (e.g., PECOFF). For example, it will be appreciated that various errors may have a higher likelihood of being repairable than other errors. Similarly, a PE file having relatively few errors may have a higher likelihood of being repairable than a PE file having a relatively large number of errors.

Repair process 12 may determine 102 the likelihood of repairing an invalid field including comparing the identified 100 invalid field(s) (including the attributes of the invalid fields that fail to comply with PECOFF) against a library of possible errors and likelihood of repairing the error. The library (e.g., library 22 residing on storage device 18) may include empirically derived data of various errors that have previously been encountered and whether it was possible to repair the error to obtain an executable file.

As mentioned above, repair process 12 may generate 104 a repair model for repairing the identified 100 invalid field(s). The repair model generated 104 by repair process 12 may include one or more algorithms for repairing the one or more identified 100 invalid field. Similar to determining 102 a likelihood of repairing the invalid field, repair process 12 may generate 104 the repair model based upon, at least in part, one or more empirically derived rules (e.g., which may be included in library 22). For example, repair process 12 may generate 104 a repair model for repairing an invalid SizeOfImage field having an abnormal value, in which the rule may include recalculation of a correct SizeOfImage value. Similarly, repair process 12 may generate 104 a repair model for repairing an invalid entry point section that does not include an executable attribute, in which the rule may include correcting the section attributes. In a further example, repair process 12 may generate 104 a repair model for repairing an invalid resource table data that cannot be physically located, in which the rule may include temporarily removing the invalid resource table values in the PE header. Additionally, library 22 may include rules that are empirically derived based upon a comparison between different operating system versions and the way the different operating system versions process the PE file format.

Repair process 12 may repair 106 the invalid field of the portable executable file based upon, at least in part, the repair model generated 104 by repair process 12. Some errors (i.e., invalid fields) may be repaired "on disk" by modifying PE binary image 20 residing on storage device 18. Accordingly, repair process 12 may repair 106 the invalid field may by statically repairing 116 the invalid field. Statically repairing 116 the invalid field may include modifying 118 the image of the portable executable file (e.g., PE binary image 20) on storage device 18. Repair process 12 may store 120 the modified PE image on storage device 18.

For example, and continuing with the above example, in which the PE field SizeOfImage was identified 100 as being invalid for having an abnormal value, repair process 12 may statically repair the SizeOfImage field of PE binary image 20. For example, repair process may recalculate a correct SizeOfImage value. Repair process 12 may modify PE binary image 20 to include the correct SizeOfImage value. Repair process 12 may store modified PE binary image 20 on storage device 18.

In addition to errors that may be repaired "on disk," other errors may be repaired in memory. The determination as to what errors may be repaired "on disk" on what errors may be repaired in memory may be based upon, at least in part, the empirically derived rules (e.g., which may reside in library 22). For errors that may be repaired in memory, repair process 12 may dynamically repair 122 the invalid field. To dynamically repair 122 an invalid field, repair process 12 may execute 124 the portable executable file (e.g., PE binary image 20). Repair process 12 may further modify 126 the portable executable file residing in memory (e.g., in RAM) during execution, in which the portable executable file residing in memory during execution is based upon the portable executable file (e.g., based upon PE binary image 20).

Further, repair process may repair 106 the invalid field by disabling 128 the invalid field. For example, repair process may temporarily disable 128 an invalid field by removing 130 the invalid field from an image of the portable executable file (e.g., PE binary image 20) stored on storage device 18 prior to execution of the portable executable file.

In some embodiments, repair process 12 may repair 106 an invalid field by disabling 128 the invalid field and dynamically repairing 122 the invalid field. For example, and referring to the above example in which resource table data could not be physically located, repair process 12 may temporarily remove 130 the invalid resource table values in the PE header. Repair process 12 may then execute 124 PE binary image 20 (e.g., repair process 12 may execute an unpacker of PE binary image 20) up to the original entry point of the portable executable file. The original entry point may include the first instruction of code of the portable executable file before the portable executable file was protected (e.g., packed). Once execution of PE binary image 20 reaches the original entry point the process memory may be dumped 132 to storage device 18. That is, the process memory associated with the execution of PE binary image 20 residing in RAM may be saved to storage device 18. The resource table data acquired from memory during unpacking of PE binary image 20 may be reverted to an original state, and a new PE file based upon, at least in part, the dumped process memory may be stored. Accordingly, a valid PE file (i.e., a PE file in compliance with PECOFF) may be achieved.

In an embodiment a PE binary image 24 may include a packed portable executable file. A packed portable executable file may include portable executable file (consistent with PECOFF, discussed herein above) that may include one or more software protections, such as compression, encryption, combinations of compression and encryption, etc. Automated unpacking process 14 may, generally, execute a debugging process for the packed portable executable file, and may utilize various breakpoints and callbacks to collect import address table filling data, as well as various other data that may be used to build an unprotected, valid portable executable file based upon packed (e.g., protected) PE binary image 24.

Figure 4:
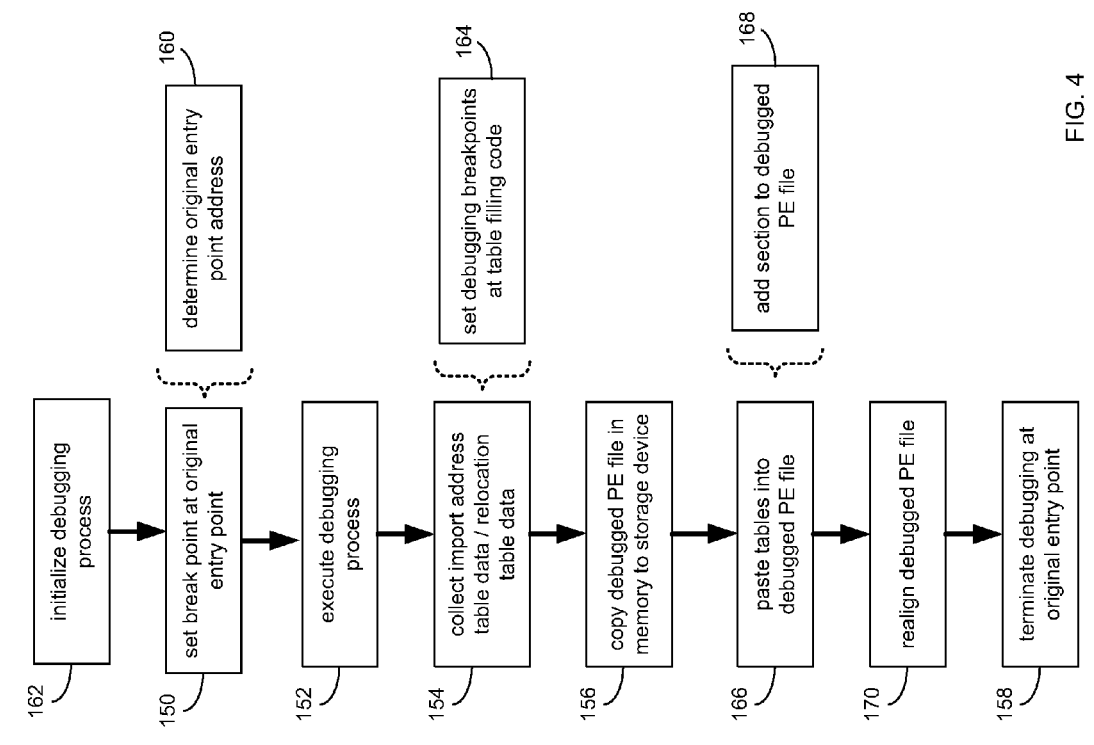
FIG. 4 is a flow diagram of a process performed by the automated unpacking process of FIG. 1.

Referring also to FIG. 4, in general automated unpacking process 14 may set 150 a debugging breakpoint at an original entry point address of a packed portable executable file (e.g., packed PE binary image 24, shown in FIG. 1). Automated unpacking process 14 may also execute 152 a debugging process for the packed portable executable file to obtain a debugged portable executable file in memory (e.g., in RAM). Automated unpacking process 14 may collect 154 one or more of import address table data and relocation table data during the execution 152 of the debugging process for the packed portable executable file. Automated unpacking process 14 may copy 156 the debugged portable executable file stored in memory to a storage medium (e.g., storage device 18). Automated unpacking process 14 may terminate 158 the debugging process at the original entry point of the portable executable file.

As discussed, automated unpacking process 14 may set 150 a debugging breakpoint at an original entry point address of packed PE binary image 24. The original entry point of packed PE binary image 24 may be the first instruction of the executable code before the file was protected. Setting 150 a debugging breakpoint at the original entry point address of packed PE binary image 24 may allow the execution of packed PE binary image 24 to be suspended prior to control being passed to the executable file embodied within packed PE binary image 24. As used herein, "execution of packed PE binary image" and "executing packed PE binary image" may refer to the execution of the file embodied by the packed PE binary image and the executing PE file embodied by the packed PE binary image. Automated unpacking process 14 may determine 160 the ImageBase field data of the packed portable executable file and AddressOfEntryPoint data of the packed portable executable file. The ImageBase field data and the AddressOfEntryPoint data may be loaded from packed PE binary image 24. The original entry point address of packed PE binary image 24 may be the sum of the ImageBase data and the AddressOfEntryPoint data. Determining the original entry point may additionally include other numeric calculations, which may be based upon, at least in part, the software packer layout itself. Automated unpacking process 14 may load various additional data from packed PE binary image 24, such as, but not limited to, ImageBase data, SizeOfImage data, and PE section data.

Automated unpacking process 14 may initialize 162 the debugging process. Initializing 162 the debugging process may include creating a debugging process based upon, at least in part, packed PE binary image 24. That is, initializing 162 the debugging process may establish a debugging environment in which packed PE binary image 24 may be executed. In the initialized debugging process, automated unpacking process 14 may set 150 a debugging breakpoint on the original entry point. The debugging breakpoint set on the original entry point will be called once the debugged process finishes loading, before execution of the first instruction of the executable file embodied within packed PE binary image 24.

Automated unpacking process 14 may execute 152 the initialized debugging process. That is, packed PE binary image 24 may be executed within the established debugging environment. Automated unpacking process 14 may collect 154 one or more of import address table data and relocation table data. Collecting 154 one or more of import address table data and relocation table data may include running the debugging process until it reaches the import address table filling code. In part, automated unpacking process 14 may collect 154 one or more of import address table data and relocation table data by setting 164 one or more debugging breakpoints associated with a LoadLibrary call, a GetModuleHandle call, and a GetProcAddress call. Additional breakpoints may also be associated with a part of the software packer that relocates the file in memory. Breakpoints associated with a LoadLibrary call, a GetModuleHandle call, and a GetProcAddress call may be set, in some embodiments, during initialization 162 of the debugging process.

Packed PE binary image 24 executing within the debugging process may utilize a LoadLibrary API call or a GetModuleHandle API call in order to load a dependent dynamic link library. Setting 164 one or more breakpoints associated with a LoadLibrary call or a GetModuleHandle call may result in a callback to automated unpacking process 14 when executing packed PE binary image 24 loads a dynamic link library. In response to the breakpoint callback associated with a LoadLibrary call or a GetModuleHandle call, automated unpacking process 14 may collect 154 the name of the dynamic link library being loaded by executing packed PE binary image 24.

Similarly, packed PE binary image 24 executing within the debugging process may utilize a GetProcAddress API call to find the locations of necessary API's (application programming interfaces). Setting 164 one or more breakpoints associated with a GetProcAddress API call may result in a callback to automated unpacking process 14 when executing packed PE binary image 24 loads the addresses of necessary API's. In response to the breakpoint callback associated with a GetProcAddress API call, automated unpacking process 14 may collect 154 the API addresses being located by executing packed PE binary image 24. Executing packed PE binary image 24 may call GetProcAddress API at two locations, e.g., for string API locating and ordinal API locating. Automated unpacking process 14 may set 164 a breakpoint associated with each GetProcAddress API call. Automated unpacking process 14 may add the locations of API's located by the GetProcAddress API calls to the last collected dynamic link library.

Automated unpacking process 14 may copy 156 a debugged PE file from memory (e.g., RAM) to a computer readable medium, such as storage device 18. Once packed PE binary image 24, executing within the debugging environment, reaches the original entry point of the executable file embodied therein, unpacking of the file may be substantially complete. That is, the file may be decompressed and/or decrypted, or the like (depending upon the nature of the protections associated with packed PE binary image 24). As such, at this point an unpacked PE file may reside in memory associated with computing device 16 (e.g., PE in memory 26, shown in FIG. 1). Automated unpacking process 14 may copy unpacked PE in memory 26, e.g., to a file residing on storage medium 18. As such, automated unpacking process 14 may create stored PE 28, which may be at least a portion of an unpacked portable executable file based upon, at least in part, packed PE binary image 24.

Automated unpacking process 14 may paste 166 one or more of an import address table, based upon, at least in part, the collected 154 import address table data, and a relocation table, based upon, at least in part, the collected 154 relocation table data into the debugged portable executable file (e.g., stored PE 28). For example, automated unpacking process 14 may construct one or more of an import address table and a relocation table based upon, at least in part, the import address table data and the relocation table data collected 154 by automated unpacking process 14 during execution 152 of the debugging process (e.g., which may include executing packed PE binary image 24 within a debugging environment).

Pasting 166 one or more of an import address table, based upon, at least in part, collected 154 import address table data, and a relocation table, based upon, at least in part, collected 154 relocation table data into the debugged portable executable file (e.g., stored PE 28) may include adding 168 a new section to the debugged portable executable file. For example, stored PE 28 may not include a section for an import address table and/or a section for a relocation table. Accordingly, automated unpacking process 14 may make space for an import address table and/or a relocation table within stored PE 28 (e.g., by adding 168 an appropriate section within stored PE 28 for an import address table and/or a relocation table). Automated unpacking process 14 may then paste 166 the import address table and/or the relocation table into the appropriate locations of stored PE 28.

Once the import address table and/or the relocation table have been pasted 166 into stored PE 28, automated unpacking process 14 may realign 170 the debugged PE file (e.g., stored PE 28). Generally, realigning 170 the debugged PE file may include compacting the file and verifying that the file is a valid image, e.g., which may include verifying that the physical sizes of the individual PE sections of the file are correct and as small as possible. Additionally, automated unpacking process 14 may make all section attributes of the debugged PE file (e.g., stored PE 28) read, write, and execute. As such, automated unpacking process 14 may create a valid PE file that may substantially resemble packed PE binary image 24 prior to packing (i.e., prior to modifying the file with software protections and/or compression).

With the unpacking process complete, automated unpacking process 14 may terminate 158 debugging of packed PE binary image 25 at the original entry point.

While various discrete processes have been discussed herein above, such separate discussion is intended for ease of explanation. The various discrete processes (and/or portions thereof) may include modules of a larger application that may interoperate with one another. Additionally, the various features and steps of the processes may be utilized in combination with features and steps of other processes described herein. Accordingly, the present disclosure should not be construed as being limited to the discrete processes as described above.

A number of implementations have been described. Nevertheless, it will be understood that various modifications may be made. Accordingly, other implementations are within the scope of the following claims.

What is claimed is:

1. A computer implemented method comprising:
   prior to execution of a binary image of a portable executable file format:
      parsing, by a computing device, the binary image of the portable executable file format running on a Windows operating system to generate a parsed field;
      determining, by the computing device, an attribute of the parsed field;
      comparing, by the computing device, the attribute of the parsed field to a valid characteristic of a valid corresponding field specified by a portable executable file format specification;
      determining, by the computing device, if the attribute of the parsed field matches the valid characteristic of the valid corresponding field specified by the portable executable file format specification, wherein determining if the attribute of the parsed field matches the valid characteristic of the valid corresponding field specified by the portable executable file format specification further includes determining, by the computing device, if the attribute of the parsed field is valid for a predetermined operating system;
      identifying, by the computing device, if the parsed field does not match the valid characteristic of the valid corresponding field; and
      determining, by the computing device, a likelihood of modifying the parsed field that does not match the valid characteristic of the valid corresponding field to generate a valid field based upon, at least in part, one or more empirically determined rules, wherein the empirically determined rules are based upon, at least in part, possible errors that occur in the parsed field and a number of modifications to implement to correct each possible error.

2. The computer implemented method of claim 1, wherein the parsed field includes one or more of a portable executable format signature, an ImageBase field, a SizeOfImage field, a FileAlignment field, a SectionAlignment field, an EntryPoint address, an import table, an import address table, an export table, a relocation table, a resource table, a thread local storage table, a load configuration table, a bound import table, a COM table, and a portable executable section table.

3. The computer implemented method of claim 1, wherein the attribute of the parsed field includes one or more of a field identifier, a field length, and a field content.

4. The computer implemented method of claim 1, further comprising determining, by the computing device, if the binary image of the portable executable file format includes a dynamic link library, a kernel driver, or an executable object.

5. A computer program product comprising a non-transitory computer readable medium having a plurality of instructions stored thereon, which, when executed by a processor, cause the processor to perform operations comprising:

prior to execution of a binary image of a portable executable file format:

parsing the binary image of the portable executable file format running on a Windows operating system to generate a parsed field;

determining an attribute of the parsed field;

comparing the attribute of the parsed field to a valid characteristic of a valid corresponding field specified by a portable executable file format specification;

determining if the attribute of the parsed field matches the valid characteristic of the valid corresponding field specified by the portable executable file format specification, wherein determining if the attribute of the parsed field matches the valid characteristic of the valid corresponding field specified by the portable executable file format specification further includes determining if the attribute of the parsed field is valid for a predetermined operating system;

identifying if the parsed field does not match the valid characteristic of the valid corresponding field; and determining a likelihood of modifying the parsed field that does not match the valid characteristic of the valid corresponding field to generate a valid field based upon, at least in part, one or more empirically determined rules, wherein the empirically determined rules are based upon, at least in part, possible errors that occur in the parsed field and a number of modifications to implement to correct each possible error.

6. The computer program product of claim 5, wherein the parsed field includes one or more of a portable executable format signature, an ImageBase field, a SizeOfImage field, a FileAlignment field, a SectionAlignment field, an EntryPoint address, an import table, an import address table, an export table, a relocation table, a resource table, a thread local storage table, a load configuration table, a bound import table, a COM table, and a portable executable section table.

7. The computer program product of claim 5, wherein the attribute of the parsed field includes one or more of a field identifier, a field length, and a field content.

8. The computer program product of claim 5, further comprising determining if the binary image of the portable executable file format includes a dynamic link library, a kernel driver, or an executable object.

9. A system comprising:

a processor;

a memory coupled with the processor;

prior to execution of a binary image of a portable executable file format:

a first software module executable by the processor and the memory, the first software module configured to parse the binary image of the portable executable file format running on a Windows operating system to generate a parsed field;

a second software module executable the by processor and the memory, the second software module configured to determine an attribute of the parsed field;

a third software module executable by the processor and the memory, the third software module configured to compare the attribute of the parsed field to a valid characteristic of a valid corresponding field specified by a portable executable file format specification;

a fourth software module executable by the processor and the memory, the fourth software module configured to determine if the attribute of the parsed field matches the valid characteristic of the valid corresponding field specified by the portable executable file format specification, wherein determining if the attribute of the parsed field matches the valid characteristic of the valid corresponding field specified by the portable executable file format specification further includes determining if the attribute of the parsed field is valid for a predetermined operating system;

a fifth software module executable by the processor and the memory, the fifth software module configured to identify if the parsed field does not match the valid characteristic of the valid corresponding field; and a sixth software module executable by the processor and the memory, the sixth software module configured to determine a likelihood of modifying the parsed field that does not match the valid characteristic of the valid corresponding field to generate a valid field based upon, at least in part, one or more empirically determined rules, wherein the empirically determined rules are based upon, at least in part, possible errors that occur in the parsed field and a number of modifications to implement to correct each possible error.

10. The system of claim 9, wherein the parsed field includes one or more of a portable executable format signature, an ImageBase field, a SizeOfImage field, a FileAlignment field, a SectionAlignment field, an EntryPoint address, an import table, an import address table, an export table, a relocation table, a resource table, a thread local storage table, a load configuration table, a bound import table, a COM table, and a portable executable section table.

11. The system of claim 9, wherein the attribute of the parsed field includes one or more of a field identifier, a field length, and a field content.

12. The system of claim 9, further comprising a seventh software module executable by the processor and the memory, the seventh software module configured to determine if the binary image of the portable executable file format includes a dynamic link library, a kernel driver, or an executable object.

* * * * *